United States Patent
Hakamaya et al.

(12)

(10) Patent No.: US 6,451,964 B1
(45) Date of Patent: Sep. 17, 2002

(54) METHOD FOR REMOVING HYDROCARBON SOLVENT FROM SOLUTION OF HYDROGENATED BLOCK COPOLYMER IN HYDROCARBON SOLVENT

(75) Inventors: Atsuo Hakamaya, Yokohama; Yasumasa Yamakoshi, Tokyo; Masami Kamaya, Yamato, all of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/857,646
(22) PCT Filed: Oct. 27, 2000
(86) PCT No.: PCT/JP00/07607
§ 371 (c)(1), (2), (4) Date: Jun. 7, 2001
(87) PCT Pub. No.: WO01/30859
PCT Pub. Date: May 3, 2001

(30) Foreign Application Priority Data

Oct. 28, 1999 (JP) ............................................ 11-307147

(51) Int. Cl.[7] .................................................. C08F 6/00
(52) U.S. Cl. ...................................... 528/480; 528/500
(58) Field of Search ................................. 528/500, 480

(56) References Cited

U.S. PATENT DOCUMENTS 5,616,652 A   4/1997  Kusano et al. ............... 525/315

FOREIGN PATENT DOCUMENTS

| EP | 0992520 A1 | 4/2000 |
| JP | 58147406 A | 9/1983 |
| JP | 2182703 A | 7/1990 |
| JP | 2185503 A | 7/1990 |

*Primary Examiner*—Terressa M. Boykin
(74) *Attorney, Agent, or Firm*—Birch, Stewart, Kolasch & Birch, LLP

(57) ABSTRACT

Disclosed is a method for removing a hydrocarbon solvent from a hydrocarbon solvent solution of a hydrogenated block copolymer which is obtained by hydrogenating a block copolymer comprising a polymer block composed mainly of vinyl aromatic monomer units and a polymer block composed mainly of conjugated diene monomer units, wherein the weight ratio of the vinyl aromatic monomer units to the conjugated diene monomer units is from 5/95 to 95/5, wherein the hydrogenated block copolymer has a degree of hydrogenation of 30% or more with respect to double bonds in the conjugated diene monomer units, and wherein the method comprises: (1) mixing a hydrocarbon solvent solution of the hydrogenated block copolymer with heated water to obtain a dispersion of the solution in the heated water, and (2) introducing the dispersion into a steam stripping vessel containing heated water, wherein the dispersion is spouted into the gaseous phase in the vessel toward the surface of the heated water in the vessel under conditions wherein the vapor pressure $P_1$ of the dispersion and the pressure $P_2$ of the gaseous phase in the vessel satisfy the formula: $P_1 \geq P_2$, thereby effecting a steam stripping of the dispersion to remove the solvent therefrom and obtain porous crumbs of the hydrogenated block copolymer.

8 Claims, 1 Drawing Sheet

US 6,451,964 B1

METHOD FOR REMOVING HYDROCARBON SOLVENT FROM SOLUTION OF HYDROGENATED BLOCK COPOLYMER IN HYDROCARBON SOLVENT

This application is the national phase under 35 U.S.C. §371 of PCT International Application No. PCT/JP00/07607 which has an International filing date of Oct. 27, 2000, which designated the United States of America and was not published in English.

BACKGROUND OF THE INVENTION

1. Field of the Invention

The present invention relates to a method for removing a hydrocarbon solvent from a hydrocarbon solvent solution of a hydrogenated block copolymer. More particularly, the present invention is concerned with a method for removing a hydrocarbon solvent from a hydrocarbon solvent solution of a hydrogenated block copolymer which is obtained by hydrogenating a block copolymer comprising at least one polymer block composed mainly of vinyl aromatic monomer units and at least one polymer block composed mainly of conjugated diene monomer units, wherein the vinyl aromatic monomer units and the conjugated diene monomer units are contained in a specific amount ratio, wherein the hydrogenated block copolymer has a specific degree of hydrogenation, and wherein the method comprises the steps of: (1) mixing a hydrocarbon solvent solution of the hydrogenated block copolymer with heated water to obtain a dispersion of the hydrocarbon solvent solution in the heated water, and (2) introducing the dispersion into a steam stripping vessel containing heated water, wherein the dispersion is spouted into the gaseous phase in the steam stripping vessel toward the surface of the heated water in the steam stripping vessel under conditions wherein the vapor pressure $P_1$ of the dispersion and the pressure $P_2$ of the gaseous phase in the steam stripping vessel satisfy the formula: $P_1 \geq P_2$, thereby effecting a steam stripping of the dispersion to remove the hydrocarbon solvent from the dispersion and obtain porous crumbs of the hydrogenated block copolymer.

By the method of the present invention, desired porous crumbs can be stably and efficiently produced for a long period of time. Further, by subjecting the porous crumbs produced by the method of the present invention to dehydration and drying, dried porous crumbs can be continuously produced stably for a long period of time. The dried porous crumbs thus produced have not only excellent handling properties but also a low water content and a high oil-absorbing capability, so that the dried porous crumbs can absorb a satisfactory amount of a liquid additive, such as a softening agent or a silicone oil. Therefore, when the dried porous crumbs are used as a modifier in the production of a molding resin composition from a thermoplastic resin and a liquid additive, such as a softening agent or a silicone oil, a shaped article having an excellent appearance can be produced by molding the molding resin composition.

2. Prior Art

A hydrogenation product of a block copolymer comprising a polymer block composed mainly of vinyl aromatic monomer units and a polymer block composed mainly of conjugated diene monomer units (hereinafter, the hydrogenation product is frequently referred to simply as a "hydrogenated block copolymer") not only has excellent properties with respect to weathering resistance, heat resistance and impact resistance, but also exhibits, even if not vulcanized, excellent strength and excellent elasticity both at room temperature, which are comparable to those of a conventional vulcanized rubber. Therefore, the hydrogenated block copolymer is widely used in various application fields, such as daily sundry commodities, automobile parts, parts for light electric appliances, and various products for industrial use.

Hydrogenated block copolymers are commercially available in various forms, such as pellets and crumbs. In general, crumbs of a hydrogenated block copolymer are used as a modifier in the production of a molding resin composition from a thermoplastic resin and a liquid additive, such as a softening agent or a silicone oil. For obtaining a shaped article having an excellent appearance from a molding resin composition containing a modifier, it is necessary that the crumbs used as the modifier have the capability of rapidly absorbing a satisfactory amount of a liquid additive, such as a softening agent or a silicone oil.

In general, the polymerization and hydrogenation for producing a hydrogenated block copolymer are performed in a hydrocarbon solvent inert to a polymerization catalyst and a hydrogenation catalyst, so that the hydrogenated block copolymer produced is obtained in the form of a uniform solution or suspension thereof in the hydrocarbon solvent. Therefore, it is necessary to remove the solvent from the solution or suspension. With respect to the method for removing the solvent, various methods are known. As an example of such methods, there can be mentioned a method called a "steam stripping method", which comprises adding to hot water a solution or suspension of a hydrogenated block copolymer in a solvent, and distilling off from the resultant mixture the solvent together with steam. By removing the solvent by this method, crumbs of the hydrogenated block copolymer can be obtained.

Unexamined Japanese Patent Application Laid-Open Specification No. 50-89494 (corresponding to U.S. Pat. No. 4,087,484) describes a method for removing a solvent from a hydrocarbon solvent solution of a hydrogenated block copolymer, comprising effecting a steam stripping in the presence of a specific surfactant. Unexamined Japanese Patent Application Laid-Open Specification No. 61-218614 describes a method for producing crumbs of a hydrogenated block copolymer, comprising removing a solvent from a hydrocarbon solvent solution of a hydrogenated block copolymer by steam stripping, and removing volatile components from the resultant by means of a twin-screw vented extruder. Unexamined Japanese Patent Application Laid-Open Specification No. 8-301929 (corresponding to U.S. Pat. No. 5,616,652) describes a method for producing porous crumbs of a hydrogenated block copolymer, comprising subjecting a heated hydrocarbon solvent solution of a hydrogenated block copolymer to steam stripping.

However, these methods are defective in that a polymer which has become viscous due to the removal of the solvent is likely to adhere to the steam stripping vessel or to be agglomerated. Therefore, by any of these methods, it is impossible to continuously produce crumbs stably for a long period of time.

Examined Japanese Patent Application Publication No. 2-18321 discloses a method comprising mixing a polymer solution with heated water in the presence of a surfactant and/or a dispersant to obtain an emulsion, and spouting the emulsion into the gaseous phase in a steam stripping vessel. However, when this method is applied to the removal of a solvent from a solution of a hydrogenated block copolymer, the following disadvantages arise. The wet crumbs of the hydrogenated block copolymer which are produced by this method have too small a particle diameter. Therefore, problems occur not only in that the recovery of the crumbs is difficult, but also in that, when the wet crumbs are subjected to dehydration, the dehydration of the crumbs becomes unsatisfactory. Hence, the operation cannot be efficiently conducted. Thus, it is difficult to continuously produce dried crumbs stably for a long period of time by using the wet crumbs produced by this method.

As described hereinabove, by any of the conventional methods for removing a solvent, it is impossible to continuously produce porous crumbs stably for a long period of time.

SUMMARY OF THE INVENTION

In this situation, the present inventors have made extensive and intensive studies with a view toward solving the problems accompanying the prior art. As a result, it has unexpectedly been found that stable and efficient production of desired porous crumbs can be continuously performed for a long period of time by removing a hydrocarbon solvent from a hydrocarbon solvent solution of a hydrogenated block copolymer in accordance with the undermentioned method. The hydrogenated block copolymer is obtained by hydrogenating a block copolymer comprising at least one polymer block composed mainly of vinyl aromatic monomer units and at least one polymer block composed mainly of conjugated diene monomer units, wherein the vinyl aromatic monomer units and the conjugated diene monomer units are contained in a specific amount ratio, wherein the hydrogenated block copolymer has a specific degree of hydrogenation. The method comprises the steps of: (1) mixing a hydrocarbon solvent solution of the hydrogenated block copolymer with heated water to obtain a dispersion of the hydrocarbon solvent solution in the heated water, and (2) introducing the dispersion into a steam stripping vessel containing heated water, wherein the dispersion is spouted into the gaseous phase in the steam stripping vessel toward the surface of the heated water in the steam stripping vessel under conditions wherein the vapor pressure $P_1$ of the dispersion and the pressure $P_2$ of the gaseous phase in the steam stripping vessel satisfy the formula: $P_1 \geq P_2$, thereby effecting a steam stripping of the dispersion to remove the hydrocarbon solvent from the dispersion and obtain porous crumbs of the hydrogenated block copolymer. It has also been found that, by subjecting the porous crumbs produced by this method to dehydration and drying, dried porous crumbs having not only excellent handling properties but also a low water content and a high oil-absorbing capability can be continuously produced stably for a long period of time. The dried porous crumbs thus produced can absorb a satisfactory amount of a liquid additive, such as a softening agent or a silicone oil. Therefore, when the dried porous crumbs are used as a modifier in the production of a molding resin composition from a thermoplastic resin and a liquid additive, such as a softening agent or a silicone oil, a shaped article having an excellent appearance can be produced by molding the molding the resin composition. Based on these findings, the present invention has been completed.

Accordingly, it is a primary object of the present invention to provide a method for continuously producing porous crumbs stably and efficiently for a long period of time which porous crumbs are advantageous in that, when the porous crumbs are subjected to dehydration and drying to produce dried porous crumbs, the dried porous crumbs exhibit desired properties, such as excellent handling properties, a low water content and a high oil-absorbing capability.

The foregoing and other objects, features and advantages of the present invention will be apparent from the following detailed description and appended claims taken in connection with the accompanying drawing.

DESCRIPTION OF REFERENCE NUMERALS

Figure 1:
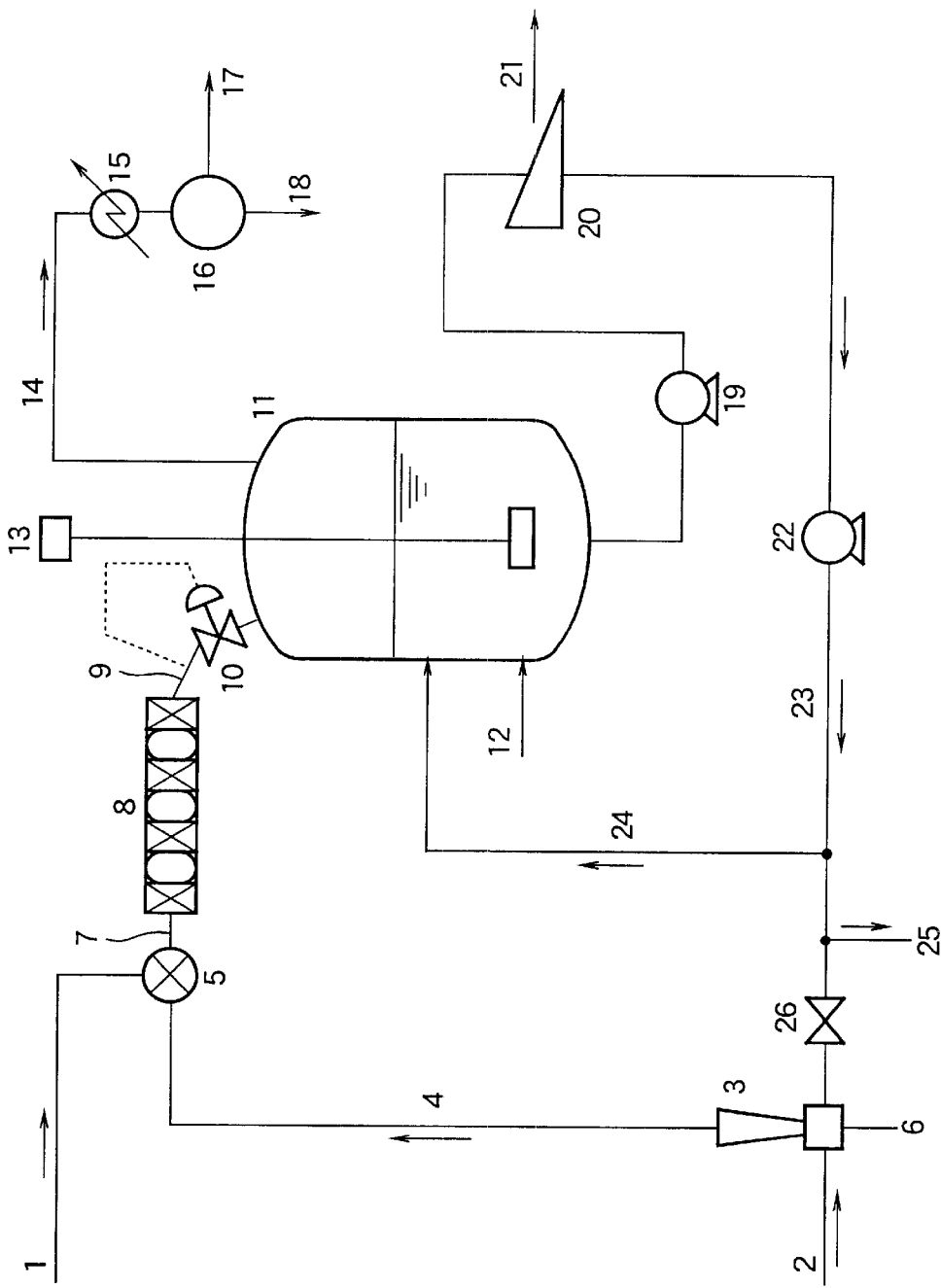
FIG. 1 is a diagram showing an example of the system for practicing the method of the present invention.

1, 2, 4, 6, 7, 9, 12, 14, 23, 24 and 25: Pipe
3: Injector
5: Mixer
8: Static tubular agitator
10: Pressure control valve
11: Steam stripping vessel
13: Electric stirrer
15: Condenser
16: Solvent separation vessel
17: Solvent
18: Water
19: Pump
20: Dehydrator
21: Wet porous crumbs
22: Pump
26: Opening/closing valve

DETAILED DESCRIPTION OF THE INVENTION

According to the present invention, there is provided a method for removing a hydrocarbon solvent from a hydrocarbon solvent solution of a hydrogenated block copolymer, the hydrogenated block copolymer being obtained by hydrogenating a block copolymer comprising at least one polymer block composed mainly of vinyl aromatic monomer units and at least one polymer block composed mainly of conjugated diene monomer units, wherein the weight ratio of the vinyl aromatic monomer units to the conjugated diene monomer units is in the range of from 5/95 to 95/5, the hydrogenated block copolymer having a degree of hydrogenation of 30% or more with respect to the double bonds in the conjugated diene monomer units, the method comprising the steps of:

(1) mixing a hydrocarbon solvent solution of the hydrogenated block copolymer with heated water to obtain a dispersion of the hydrocarbon solvent solution in the heated water, and (2) introducing the dispersion into a steam stripping vessel containing heated water, wherein the dispersion is spouted into the gaseous phase in the steam stripping vessel toward the surface of the heated water in the steam stripping vessel under conditions wherein the vapor pressure $P_1$ (MPa) of the dispersion and the pressure $P_2$ (MPa) of the gaseous phase in the steam stripping vessel satisfy the following formula:

$$P_1 \geq P_2,$$

thereby effecting a steam stripping of the dispersion to remove the hydrocarbon solvent from the dispersion and obtain porous crumbs of the hydrogenated block copolymer.

For easy understanding of the present invention, the essential features and various preferred embodiments of the present invention are enumerated below.

1. A method for removing a hydrocarbon solvent from a hydrocarbon solvent solution of a hydrogenated block copolymer,
   the hydrogenated block copolymer being obtained by hydrogenating a block copolymer comprising at least one polymer block composed mainly of vinyl aromatic monomer units and at least one polymer block composed mainly of conjugated diene monomer units, wherein the weight ratio of the vinyl aromatic monomer units to the conjugated diene monomer units is in the range of from 5/95 to 95/5,
   the hydrogenated block copolymer having a degree of hydrogenation of 30% or more with respect to the double bonds in the conjugated diene monomer units,
   the method comprising the steps of:
   (1) mixing a hydrocarbon solvent solution of the hydrogenated block copolymer with heated water to obtain a dispersion of the hydrocarbon solvent solution in the heated water, and
   (2) introducing the dispersion into a steam stripping vessel containing heated water, wherein the dispersion is spouted into the gaseous phase in the steam stripping vessel toward the surface of the heated water in the steam stripping vessel under conditions wherein the vapor pressure $P_1$ (MPa) of the dispersion and the pressure $P_2$ (MPa) of the gaseous phase in the steam stripping vessel satisfy the following formula:

$$P_1 \geq P_2$$

thereby effecting a steam stripping of the dispersion to remove the hydrocarbon solvent from the dispersion and obtain porous crumbs of the hydrogenated block copolymer.
2. The method according to item 1 above, wherein the dispersion is not emulsified.
3. The method according to item 1 above, wherein the dispersion is passed through a pressure control valve after step (1) and prior to step (2), to thereby adjust the pressure $P_3$ (MPa) of the dispersion, as measured at the entrance of the pressure control valve, to a level which is equal to or higher than the vapor pressure $P_1$ (MPa) of the dispersion.
4. The method according to item 1 above, wherein the dispersion has a weight ratio of the heated water to the hydrocarbon solvent solution of the hydrogenated block copolymer in the range of from 1.0 to 100.
5. The method according to item 1 above, wherein, in step (2), the vapor pressure $P_1$ of the dispersion is 0.05 MPa or more higher than the pressure $P_2$ of the gaseous phase in the steam stripping vessel.
6. The method according to item 1 above, wherein the spouting of the dispersion into the gaseous phase in the steam stripping vessel in step (2) is conducted within 5 seconds after the mixing of the hydrocarbon solvent solution of the hydrogenated block copolymer with the heated water.
7. The method according to item 1 above, wherein the dispersion is agitated by using a static tubular agitator after step (1) and prior to step (2), to thereby maintain the dispersion state of said dispersion.
8. The method according to item 7 above, wherein, after the dispersion is agitated by using the static tubular agitator and before step (2), the dispersion is passed through a pressure control valve to thereby adjust the pressure $P_3$ (MPa) of the dispersion, as measured at the entrance of the pressure control valve, to a level which is equal to or higher than the vapor pressure $P_1$ (MPa) of the dispersion.
9. The method according to item 1 above, wherein the molecular weight of the hydrogenated block copolymer is 70,000 or more.

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "conjugated diene monomer unit" means a monomer unit which is formed in a polymer obtained by the polymerization of the conjugated diene monomer. The conjugated diene monomer unit has a molecular structure wherein the two carbon atoms of an olefin corresponding to the conjugated diene monomer respectively form linkages to adjacent conjugated diene monomer units.

In step (1) of the method of the present invention, a hydrocarbon solvent solution of a hydrogenated block copolymer is mixed with heated water to obtain a dispersion of the hydrocarbon solvent solution in the heated water.

The block copolymer used in the present invention comprises at least one polymer block composed mainly of vinyl aromatic monomer units (hereinafter, this polymer block is referred to as an "A block") and at least one polymer block composed mainly of conjugated diene monomer units (hereinafter, this polymer block is referred to as a "B block"), wherein the weight ratio of the vinyl aromatic monomer units to the conjugated diene monomer units is in the range of from 5/95 to 95/5.

With respect to the block copolymer used in the present invention, there is no particular limitation as long as it satisfies the above-mentioned requirements. The block copolymer can be selected from conventional block copolymers.

It is preferred that the block copolymer has a vinyl aromatic monomer unit content of from 10 to 90% by weight. By varying the vinyl aromatic monomer unit content within the above-mentioned range, block copolymers having different properties can be obtained. For example, when the block copolymer has a vinyl aromatic monomer unit content of 60% by weight or less, especially 55% by weight or less, the block copolymer exhibits properties similar to those of a thermoplastic elastomer. On the other hand, when the block copolymer has a vinyl aromatic monomer unit content of more than 60% by weight, especially 65% by weight or more, the block copolymer exhibits properties similar to those of a thermoplastic resin.

Examples of A blocks include (A-1) a block composed only of vinyl aromatic monomer units, and (A-2) a copolymer block comprising vinyl aromatic monomer units and conjugated diene monomer units, wherein the vinyl aromatic monomer unit content of the copolymer block is 50% by weight or more, preferably 70% by weight or more.

Examples of B blocks include (B-1) a block composed only of conjugated diene monomer units, and (B-2) a copolymer block comprising conjugated diene monomer units and vinyl aromatic monomer units, wherein the conjugated diene monomer unit content of the copolymer block is more than 50% by weight, preferably 70% by weight or more.

With respect to the polymer structures of copolymer blocks (A-2) and (B-2), each of which comprises vinyl aromatic monomer units and conjugated diene monomer units, there is no particular limitation. For example, the vinyl aromatic monomer units and the conjugated diene monomer units may be uniformly distributed or may be distributed in a tapered configuration in the copolymer block. The block copolymer may have a plurality of polymer blocks in which the vinyl aromatic monomer units or the conjugated diene monomer units are uniformly distributed and/or may have a plurality of polymer blocks in which the vinyl aromatic monomer units or the conjugated diene monomer units are distributed in a tapered configuration.

The block copolymer used in the present invention may be a mixture of block copolymers having different compositions.

Examples of block copolymers used in the present invention include a linear block copolymer and a radial block copolymer, each of which can be produced by a method in which a multifunctional organolithium compound is used as a polymerization initiator or a method in which block copolymers each having an active terminal are coupled with each other by using an appropriate coupling reagent. Examples of such linear block copolymers and radial block copolymers include those having block configurations each represented by any of the following formulae:

$(A-B)_n$, $A-(B-A)_n$, $B-(A-B)_n$ $((B-A)_n)_m-X$, $((A-B)_n)_m-X$, $((B-A)_n-B)_m-X$, and $((A-B)_n-A)_m-X$, wherein A represents a polymer block composed mainly of vinyl aromatic monomer units (i.e., A block), B represents a polymer block composed mainly of conjugated diene monomer units (i.e., B block), m represents an integer of 2 or more, n represents an integer of 1 or more, and X represents a residue of a multifunctional coupling reagent or a residue of a polymerization initiator, such as a multifunctional organolithium compound.

In the case of a radial block copolymer having the above-mentioned residue X of a multifunctional coupling reagent, it is not necessary that all functional groups in the coupling reagent used for producing the radial block copolymer have been reacted. For example, when the radial block copolymer is produced using a tetrafunctional coupling reagent, the radial block copolymer may be a mixture of at least two polymers selected from the group consisting of polymers having block configurations each represented by any of the following formulae: $(A-B)_4-X$, $(A-B)_3-X$, $(A-B)_2-X$ and A-B-X.

With respect to the multifunctional coupling reagent, there is no particular limitation. Examples of multifunctional coupling reagents include polyhalides, such as dimethyldichlorosilane, methyltrichlorosilane, dimethyldibromosilane, methyltribromosilane, methylene chloride, methylene bromide, chloroform, carbon tetrachloride, silicon tetrachloride and tin tetrachloride; esters, such as methyl benzoate, ethyl benzoate, phenyl benzoate, a trimellitic acid ester and a phthalic acid ester; and polyepoxy compounds, such as an epoxidized soybean oil, diglycidyl bisphenol A and N,N,N',N'-tetraglycidyl-1,3-bisaminomethyl-cyclohexane.

Examples of vinyl aromatic monomer units include those derived from styrene, o-methylstyrene, p-methylstyrene, p-tert-butylstyrene, 2,4-dimethylstyrene, α-methylstyrene, vinylnaphthalene, 9-vinylanthracene and 1,1-diphenylethylene. Of these, a monomer unit derived from styrene is especially preferred. These vinyl aromatic monomer units can be used individually or in combination.

Examples of conjugated diene monomer units include those derived from 1,3-butadiene, 2-methyl-1,3-butadiene (isoprene), 2,3-dimethyl-1,3-butadiene, 1,3-pentadiene and 1,3-hexadiene. Of these, monomer units derived from 1,3-butadiene, isoprene or the like are especially preferred. These conjugated diene monomer units can be used individually or in combination.

When the B block is produced by polymerizing 1,3-butadiene, which is a straight chain conjugated diene monomer, a polybutadiene block is obtained as the B block. The microstructure of a polybutadiene contains the 1,4-bond (cis 1,4-bond and trans 1,4-bond) and the 1,2-bond (vinyl bond). With respect to the ratios of the 1,4-bonds and the 1,2-bonds in the polybutadiene, there is no particular limitation. The ratios of these bonds vary depending on the polymerization conditions. It is preferred that the B block has a 1,2-bond content of from 10 to 95 mol %, more advantageously from 10 to 80 mol %. When the B block is a polyisoprene block, which is produced by polymerizing isoprene, it is preferred that the B block has a 3,4-vinyl bond content of from 3 to 80 mol %, more advantageously from 5 to 70 mol %.

Dried porous crumbs can be obtained by subjecting the porous crumbs produced by the method of the present invention to dehydration and drying. Further, a molding resin composition can be produced by adding, to a thermoplastic resin, a mixture of the thus obtained dried porous crumbs and a liquid additive (such as an oil functioning as a softening agent or a plasticizer). For obtaining a shaped article having an excellent appearance from the molding resin composition, it is preferred that the conjugated diene monomer units of the block copolymer have a vinyl bond content in the following ranges. When 1,3-butadiene is used for forming the conjugated diene monomer units of the block copolymer, it is preferred that the conjugated diene monomer units have a 1,2-vinyl bond content in the range of from 25 to 75 mol %. When isoprene is used for forming the conjugated diene monomer units of the block copolymer, it is preferred that the conjugated diene monomer units have a 3,4-vinyl bond content in the range of from 5 to 70 mol %. When 1,3-butadiene and isoprene are used for forming the conjugated diene monomer units, it is preferred that the conjugated diene monomer units have a vinyl bond content (the total content of the 1,2-vinyl bond and the 3,4-vinyl bond) in the range of from 8 to 70 mol %.

The block copolymer used in the present invention can be produced by conventional methods. A preferred method for producing the block copolymer comprises block copolymerizing a vinyl aromatic monomer with a conjugated diene monomer in a hydrocarbon solvent in the presence of an anionic polymerization initiator, such as an organolithium compound, to thereby obtain a block copolymer in the form of a solution thereof in a hydrocarbon solvent. This method is described in, for example, Examined Japanese Patent Application Publication No. 36-19286 (corresponding to U.S. Pat. No. 2,975,160), Examined Japanese Patent Application Publication No. 43-17979 (corresponding to U.S. Pat. No. 4,600,749) and Examined Japanese Patent Application Publication No. 49-36957 (corresponding to U.S. Pat. No. 3,281,383).

Examples of hydrocarbon solvents used in the above-mentioned method include aliphatic hydrocarbons, such as butane, pentane, hexane, isopentane, heptane and octane;

alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These hydrocarbon solvents can be used individually or in combination. Of these hydrocarbon solvents, cyclohexane is especially preferred.

With respect to the hydrocarbon solvent solution of a block copolymer which solution is obtained by the above-mentioned method, it is preferred that the amount of the hydrocarbon solvent is from 50 to 4,000 parts by weight, more advantageously from 100 to 2,000 parts by weight, relative to 100 parts by weight of the block copolymer.

Depending on the properties of the block copolymer and the type of the hydrocarbon solvent used, it is possible that the block copolymer has poor solubility in the hydrocarbon solvent, so that the block copolymer is obtained in the form of a suspension thereof in the hydrocarbon solvent. In the present invention, such a suspension is also defined as a hydrocarbon solvent solution of a block copolymer.

The organolithium compound used as an anionic polymerization initiator in the above-mentioned method is an organic compound having in a molecule thereof at least one lithium atom. That is, the organolithium compound can be any of an organomonolithium compound, an organodilithium compound and an organopolylithium compound. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. These organolithium compounds can be used individually or in combination. In the production of the block copolymer, the organolithium compound may be stepwise added to the polymerization reaction system once or more in the course of polymerization.

In the present invention, a polar compound or a randomizing agent can be used for various purposes, such as the control of the polymerization rate, the control of the microstructure of the conjugated diene monomer units of the block copolymer (i.e., the "cis bond/trans bond/vinyl bond " ratio), and the control of the ratio of the vinyl aromatic monomer units to the conjugated diene monomer units in the block copolymer.

Examples of polar compounds and randomizing agents include amines, such as N,N,N',N'-tetramethylethylenediamine (TMEDA), trimethylamine, triethylamine and 1,4-diazabicyclo[2,2,2]octane; ethers, such as tetrahydrofuran, diethylene glycol dimethyl ether and diethylene glycol dibutyl ether; thioethers; phosphines; phosphoramides; salts of an alkylbenzenesulfonic acid; and alkoxides of potassium or sodium. Of these, tertiary amines (such as TMEDA) and ethers (such as tetrahydrofuran) are especially preferred.

In the present invention, a terminal-modified block copolymer in which a polar group-containing group is bonded to at least one terminal of the polymer chain can be used. As an example of polar group-containing groups, there can be mentioned a group containing at least one polar group selected from the group consisting of a hydroxyl group, an aldehyde group, a thioaldehyde group, a carbonyl group, a thiocarbonyl group, an acid halide group, an acid anhydride group, a carboxyl group, a thiocarboxyl group, a carboxylic ester group, an amide group, a sulfonic acid group, a sulfonic ester group, a phosphoric acid group, a phosphoric ester group, an amino group, an imino group, a nitrile group, a pyridyl group, a quinolyl group, an epoxy group, a thioepoxy group, a sulfide group, an isocyanate group, an isothiocyanate group, a silicon halide group, an alkoxysilicon group, a stannyl halide group, an alkoxystannyl group and a phenylstannyl group. As a specific example of the terminal-modified block copolymer, there can be mentioned a terminal-modified block copolymer described in Examined Japanese Patent Application Publication No. 4-28034 (corresponding to U.S. Pat. No. 5,115,035).

The block copolymerization for producing the block copolymer may be terminated by using a deactivator. Examples of deactivators include conventional polymerization terminators which have an active hydrogen having the capability of deactivating the active terminal of a living polymer. Preferred examples of polymerization terminators include water, alcohols having 1 to 10 carbon atoms, ketones, polyhydric alcohols (such as ethylene glycol, propylene glycol and glycerol), phenols, hindered phenol (which acts also as an antioxidant), acids, hydrocarbon halides, amines and mixtures thereof. Of these, especially preferred are methanol, ethanol and propanol, that is, an aliphatic, saturated alcohol having 1 to 3 carbon atoms. The reason for the preference for these three alcohols is as follows. Each of methanol, ethanol and propanol has a low boiling point and an excellent volatility. Therefore, when the hydrocarbon solvent is removed from the hydrocarbon solvent solution of the block copolymer or a hydrogenation product thereof, the alcohol does not remain in the block copolymer or a hydrogenation product thereof, so that the block copolymer or a hydrogenation product thereof becomes free from the odor of the alcohol.

Generally, in the present invention, either a hydrocarbon solvent solution of the block copolymer which solution is obtained by the above-mentioned method or a solution obtained by dissolving a block copolymer in a hydrocarbon solvent is subjected to hydrogenation reaction to obtain a hydrocarbon solvent solution of a hydrogenated block copolymer which has a degree of hydrogenation of 30% or more with respect to the double bonds in the conjugated diene monomer units. If desired, in the hydrogenation reaction, the active terminal of the block copolymer may be deactivated using a polymerization terminator. Alternatively, the block copolymer having the active terminal as such may be subjected to hydrogenation reaction.

Examples of catalysts for the hydrogenation of the block copolymer include: (1) carrier-supported, heterogeneous catalysts; and (2) Ziegler type catalysts, organic complex catalysts, and homogeneous catalysts using a titanocene compound.

The hydrogenation can be performed by methods described in Examined Japanese Patent Application Publication No. 63-4841 (corresponding to U.S. Pat. No. 4,501,857) and Examined Japanese Patent Application Publication No. 63-5401 (corresponding to U.S. Pat. No. 4,501,857), in each of which the hydrogenation is performed in a hydrocarbon solvent in the presence of a hydrogenation catalyst.

In step (1) of the method of the present invention, as the hydrocarbon solvent solution of the hydrogenated block copolymer, the reaction mixture obtained by the above-mentioned hydrogenation as such can be used. Alternatively, a solution obtained by dissolving the hydrogenated block copolymer in a hydrocarbon solvent can be used. When the latter is used as the hydrocarbon solvent solution of the hydrogenated block copolymer, the same hydrocarbon solvent as used for producing the above-mentioned block copolymer can be used as the hydrocarbon solvent for dissolving the hydrogenated block copolymer.

The amount of the hydrocarbon solvent in the hydrocarbon solvent solution of the hydrogenated block copolymer is preferably from 50 to 4,000 parts by weight, more preferably from 100 to 2,000 parts by weight, relative to 100 parts by weight of the hydrogenated block copolymer.

Depending on the properties of the hydrogenated block copolymer and the type of the hydrocarbon solvent used, it is possible that the hydrogenated block copolymer has poor solubility in the hydrocarbon solvent, so that the hydrogenated block copolymer is obtained in the form of a suspension thereof in the hydrocarbon solvent. In the present invention, such a suspension is also defined as a hydrocarbon solvent solution of a hydrogenated block copolymer.

With respect to the degree of hydrogenation of the hydrogenated block copolymer constituting the porous crumbs produced by the method of the present invention, the desired degree of hydrogenation can be achieved by controlling the reaction temperature for the hydrogenation, the reaction time for the hydrogenation, the amount of hydrogen used for the hydrogenation, the amount of a catalyst used and the like.

The degree of hydrogenation of the hydrogenated block copolymer used in the present invention is 30% or more, preferably 50% or more, more preferably 90% or more, with respect to the double bonds in the conjugated diene monomer units. When a hydrogenated block copolymer having a degree of hydrogenation of less than 30% is used for producing porous crumbs, disadvantages are likely to occur in that, during the molding of a molding resin composition containing the dried porous crumbs obtained by subjecting the porous crumbs to dehydration and drying, the dried porous crumbs suffer thermal deterioration, and that the compatibility of the dried porous crumbs with other resins used in the molding resin composition becomes poor.

For obtaining a shaped article having excellent weathering resistance and heat resistance by the use of the above-mentioned molding resin composition, it is preferred that the above-mentioned hydrogenation degree with respect to the double bonds in the conjugated diene monomer units is as high as possible.

With respect to the degree of hydrogenation of the aromatic double bonds in the vinyl aromatic monomer units of the hydrogenated block copolymer, there is no particular limitation; however, the degree of hydrogenation is preferably 50% or less, more preferably 30% or less, still more preferably 20% or less.

The degree of hydrogenation can be measured by means of an infrared spectrophotometer (IR), a nuclear magnetic resonance (NMR) apparatus or the like.

In the present invention, the molecular weight of the hydrogenated block copolymer constituting the porous crumbs produced by the method of the present invention is appropriately selected, taking into consideration the productivity of the dried porous crumbs obtained by subjecting the porous crumbs to dehydration and drying, and the balance of the moldability of a molding resin composition containing the dried porous crumbs and the properties of a shaped article obtained from the molding resin composition. The molecular weight of the hydrogenated block copolymer is preferably in the range of 70,000 or more, more preferably from 70,000 to 1,000,000, still more preferably from 90,000 to 800,000, most preferably from 200,000 to 800,000.

When the molecular weight of the hydrogenated block copolymer is in the above-mentioned range, a shaped article obtained from the molding resin composition containing the dried porous crumbs exhibits excellent tensile strength, excellent compressive strain resistance and the like, so that the molding resin composition can be advantageously used for producing parts for an automobile, an industrial purpose product, medical equipment and the like.

In the present invention, the term "molecular weight" of a hydrogenated block copolymer means a peak molecular weight of the hydrogenated block copolymer as measured by gel permeation chromatography (GPC) using a calibration curve obtained using a chromatogram of standard monodisperse polystyrene samples.

A stabilizer (mainly an antioxidant) or the like may be added to the hydrocarbon solvent solution of the hydrogenated block copolymer. By the addition of a stabilizer, the oxidative or thermal deterioration of the polymer can be effectively prevented during the removal of the solvent in step (2) of the method of the present invention.

With respect to the stabilizer, there is no particular limitation, and conventional stabilizers can be used. Examples of conventional stabilizers include phenol stabilizers, organic phosphate stabilizers, organic phosphate stabilizers, amine stabilizers and sulfur-containing stabilizers. The stabilizer is generally used in an amount of from 0.001 to 10 parts by weight, relative to 100 parts by weight of the hydrogenated block copolymer.

Further, for the prevention of discoloration, a carboxylic acid, carbon dioxide gas or an alcohol may be added to the hydrocarbon solvent solution of the hydrogenated block copolymer.

In step (1) of the method of the present invention, the hydrocarbon solvent solution of the hydrogenated block copolymer is mixed with heated water to obtain a dispersion of the hydrocarbon solvent solution in the heated water. With respect to the method for performing the mixing to obtain the dispersion, there is no particular limitation. Examples of such methods include a method in which the solution and heated water are introduced into a mixer (a) in which the solution is mixed with the heated water while effecting a static or mechanical agitation.

Examples of methods for mixing the solution with heated water while effecting a static agitation include a method in which the mixing is conducted by spouting the solution into heated water which has been introduced in the mixer (a), and a method in which the mixing is conducted using a static tubular agitator as the mixer (a).

The method in which the mixing is conducted by spouting the solution into heated water which has been introduced in the mixer (a) is a mixing method which utilizes the action of shearing force or impact force caused by the high speed flow of the solution being spouted into the heated water. In this method, it is preferred to use a nozzle for spouting the solution into the heated water.

The static tubular agitator as the mixer (a) for use in the preparation of the dispersion has no driving part. A fluid introduced into the static tubular agitator is passed through the element provided in the static tubular agitator. During the passage of the fluid through the element, the fluid is subjected to division, positional shifting and swirling, thus causing the fluid to undergo turbulence and agitation, thereby performing a mixing. With respect to the static tubular agitator for use in the preparation of the dispersion, there is no particular limitation as long as it has the capability of statically agitating/mixing of two types of fluids which have different specific gravities. Specific examples of static tubular agitators include STATIC MIXEX (manufactured and sold by NORITAKE CO., LTD., Japan), Hi-MIXER (manufactured and sold by Toray Engineering Co., Ltd., Japan), T.K.-ROSS ISG MIXER (manufactured and sold by Tokushu Kika Kogyo Co., Ltd., Japan) and T.K.-ROSS LPD MIXER (manufactured and sold by Tokushu Kika Kogyo Co., Ltd., Japan). As described below, it is preferred that the dispersion obtained by mixing the solution with the heated water is not stably emulsified, i.e., it is preferred that the dispersion state can be maintained only for a short time. When the dispersion state of the dispersion can be maintained only for a short time, it is necessary that the dispersion be introduced into the steam stripping vessel in step (2) within a short time from the preparation of the dispersion in step (1). In this respect, it is preferred that the mixer (a) for the preparation of the dispersion is a static tubular agitator, since a static tubular agitator can agitate the dispersion until immediately before the dispersion is introduced into -the steam stripping vessel used in step (2) described below.

The term "mechanical agitation" means an agitation by the use of the action of shearing force, slipping force or the like caused by mechanical energy. Specific examples of mixers (a) used for mixing the solution with heated water by mechanical agitation include a stirrer, a line mixer, a homomixer, a colloid mill and a homogenizer.

The mixing of the solution with heated water to obtain the dispersion can also be conducted using an ultrasonic dispersion device as the mixer (a), wherein the ultrasonic dispersion device utilizes ultrasonic energy.

Further, as described below, the dispersion obtained by using the mixer (a) in step (1) may be further agitated by using a static tubular agitator as an additional mixer (b) prior to step (2) described below.

As the heated water to be mixed with the hydrocarbon solvent solution of the hydrogenated block copolymer, any of deionized water and recycled water can be used, wherein the term "recycled water" means the water recycled from the steam stripping vessel used in step (2) described below. For controlling the amount of the recycled water used as the heated water to be mixed with the hydrocarbon solvent solution, a part of the recycled water may be discharged from the operation system or returned to the steam stripping vessel.

In the dispersion of the hydrocarbon solvent solution of the hydrogenated block copolymer in the heated water, the weight ratio of the heated water to the hydrocarbon solvent solution is preferably in the range of from 1.0 to 100, more preferably from 2.5 to 30, most preferably from 3.5 to 20. When the weight ratio is less than 1.0, the dispersion state of the hydrocarbon solvent solution in the heated water is likely to be poor. When the weight ratio is more than 100, not only is the production cost high, but also difficulties are likely to be encountered in the operation in the dehydration step which is conducted after step (2) is likely to be unsatisfactory.

The temperature of the hydrocarbon solvent solution prior to the mixing with the heated water is preferably from room temperature to 20 ° C. The temperature of the heated water prior to the mixing with the hydrocarbon solvent solution is preferably from higher than room temperature to 300° C., more preferably from 100 to 200° C.

It is preferred that the temperature of the dispersion of the hydrocarbon solvent solution in the heated water is controlled so that the vapor pressure $P_3$ of the dispersion satisfies the pressure requirement described below. The temperature of the dispersion is generally 300° C. or less, preferably 200° C. or less. From the viewpoint of the porosity and pore diameter of the crumbs produced, the temperature of the dispersion is more preferably from 100 to 180° C., most preferably from 100 to 150° C.

With respect to the method for controlling the temperature of the dispersion, there is no particular limitation. Examples of methods for controlling the temperature of the dispersion include a method in which prior to the mixing of the hydrocarbon solvent solution with the heated water, at least one of the temperature of the hydrocarbon solvent solution and the temperature of the heated water is controlled, and a method in which the temperature of the dispersion is controlled by the use of a multitubular heat exchanger having a structure wherein a static tubular agitator is provided in a heat conduction tube.

In step (2) of the method of the present invention, the dispersion is introduced into a steam stripping vessel containing heated water, wherein the dispersion is spouted into the gaseous phase in the steam stripping vessel toward the surface of the heated water in the steam stripping vessel under conditions wherein the vapor pressure $P_1$ (MPa) of the dispersion and the pressure $P_2$ (MPa) of the gaseous phase in the steam stripping vessel satisfy the following formula:

$$P_1 \geq P_2,$$

thereby effecting a steam stripping of the dispersion to remove the hydrocarbon solvent from the dispersion and obtain porous crumbs of the hydrogenated block copolymer.

In the present invention, the pressure is expressed in terms of the absolute pressure (MPa).

With respect to the specific method for performing the steam stripping in step (2), there is no particular limitation, and conventional methods for steam stripping can be employed. For example, a method described in Examined Japanese Patent Application Publication No. 4-65082 can be employed.

In step (2) of the method of the present invention, when the vapor pressure $P_1$ (MPa) of the dispersion and the pressure $P_2$ (MPa) of the gaseous phase in the steam stripping vessel do not satisfy the above-mentioned formula ($P_1 \geq P_2$), the removal of the hydrocarbon solvent from the dispersion in the gaseous phase in the steam stripping vessel becomes unsatisfactory.

In the method of the present invention, it is preferred that the dispersion is passed through a pressure control valve after step (1) and prior to step (2), to thereby adjust the pressure $P_3$ (MPa) of the dispersion, as measured at the entrance of the pressure control valve, to a level which is equal to or higher than the vapor pressure $P_1$ (MPa) of the dispersion. In general, the above-mentioned pressure control valve is used in such a form as connected to a pipe for introducing the dispersion into the steam stripping vessel. In this case, the pressure $P_3$ of the dispersion is defined as the pressure thereof exerted on the inner wall surface of the pipe, as measured at the entrance of the pressure control valve.

When the pressure $P_3$ of the dispersion is lower than the vapor pressure $P_1$ of the dispersion, it is possible that the following problem arises. A part of the hydrocarbon solvent in the dispersion evaporates before the dispersion is passed through the pressure control valve, so that an increase occurs in the concentration of the hydrogenated block copolymer in the dispersion. Therefore, the viscosity of the dispersion increases and, in some cases, deposition of the hydrogenated block copolymer occurs, so that the dispersion state of the hydrocarbon solvent solution in the heated water becomes poor, thereby making it difficult to obtain desired porous crumbs of the hydrogenated block copolymer. Further, in some cases, clogging occurs at the pressure control valve, so that it becomes impossible to perform the operation for a long period of time.

Therefore, in the method of the present invention, it is preferred that the vapor pressure $P_1$ of the dispersion, the pressure $P_2$ of the gaseous phase in the steam stripping vessel, and the pressure $P_3$ of the dispersion satisfy the following formula:

$$P_3 \geq P_1 \geq P_2.$$

An explanation is made below with respect to an example of the method for controlling the pressure $P_3$ of the dispersion, the vapor pressure $P_1$ of the dispersion and the pressure $P_2$ of the gaseous phase in the steam stripping vessel so that $P_3$, $P_1$ and $P_2$ satisfy the above-mentioned formula. First, the pressure $P_2$ of the gaseous phase in the steam stripping vessel is adjusted to a predetermined value. Then, by controlling the temperature of the dispersion, the vapor pressure $P_1$ of the dispersion is controlled so that the relationship between $P_1$ and $P_2$ in the above-mentioned formula is satisfied. Further, the pressure $P_3$ of the dispersion is adjusted to a predetermined level which is equal to or higher than the vapor pressure $P_1$ of the dispersion.

As a method for adjusting the pressure $P_3$ of the dispersion to a predetermined level, there can be mentioned a method in which the adjustment of the pressure $P_3$ is made by constantly controlling the valve opening degree of the pressure control valve. An example of such a method is described below.

A nozzle is provided in a side wall of the above-mentioned pipe having the pressure control valve connected thereto, wherein the nozzle is positioned near the entrance of the pressure control valve. At the outer end of the nozzle is provided a diaphragm type pressure transmission device. The pressure of the dispersion is measured by means of the pressure transmission device, and the measured value of pressure is transmitted to a field type pressure adjusting device. The pressure adjusting device compares the measured value of pressure transmitted thereto with the predetermined level of pressure preset in the pressure adjusting device. If there is a difference between the measured value of pressure and the predetermined level of pressure, the pressure adjusting device transmits to the pressure control valve a signal for performing a pressure adjusting operation in response to the pressure difference (thus performing feedback control, i.e., control by sending an output signal in response to an input signal). The regulatory operation for determining what output signal should be sent in response to the input signal can be performed by conventional techniques, such as PID action (proportional-integral-derivative action).

In step (2) of the method of the present invention, it is preferred that the vapor pressure $P_1$ of the dispersion is 0.05 MPa or more higher, more advantageously 0.10 MPa or more higher, than the pressure $P_2$ of the gaseous phase in the steam stripping vessel.

It is preferred that the vapor pressure $P_1$ of the dispersion is as high as possible. The vapor pressure $P_1$ of the dispersion has no particular upper limit; however, the vapor pressure $P_1$ is generally 4.90 MPa or less.

In the present invention, the dispersion is not emulsified. The expression "the dispersion is not emulsified" means that the dispersion is separated into two layers (i.e., a layer of the hydrocarbon solvent solution of the hydrogenated block copolymer and a layer of the heated water) within 60 seconds after the agitation of the dispersion in step (1) is stopped. It is preferred that the dispersion obtained in step (1) of the method of the present invention is separated into two layers (i.e., a layer of the hydrocarbon solvent solution of the hydrogenated block copolymer and a layer of the heated water) within about 10 seconds after the agitation of the dispersion in step (1) is stopped.

In step (1) of the method of the present invention, any of a dispersant and a surfactant is not used. When the dispersion is emulsified by incorporating thereinto a dispersant or a surfactant (i.e., when a separation between the hydrocarbon solvent solution and the heated water into two layers does not occur within 60 seconds after the agitation of the dispersion in step (1) is stopped), the following disadvantages tend to arise. The porous crumbs produced have too small a particle size, so that difficulties are encountered in the dehydration step. Further, since the hydrogenated block copolymer obtained in the form of crumbs contains the dispersant or surfactant remaining therein, the mechanical properties of the hydrogenated block copolymer are likely to become poor.

In the present invention, it is preferred that the dispersion which is not emulsified is introduced into the steam stripping vessel during the time in which the dispersion maintains its dispersion state.

In the present invention, the period of time from the point in time of the mixing of the hydrocarbon solvent solution with the heated water to obtain the dispersion to the point in time of the occurrence of the separation of the dispersion into two layers (a layer of the solution and a layer of the heated water) is designated as the "dispersion maintenance time". The dispersion maintenance time of the dispersion under predetermined conditions can be previously measured by performing an experiment. Therefore, by controlling the operation conditions so that the period of time from the point in time of the preparation of the dispersion to the point in time of the spouting of the dispersion into the gaseous phase in the steam stripping vessel becomes shorter than the dispersion maintenance time of the dispersion, which is previously measured by performing an experiment, the dispersion (which is a mixture of the hydrocarbon solvent solution with the heated water) can be spouted into the gaseous phase in the steam stripping vessel during the time in which the mixture maintains the dispersion state. In the present invention, for spouting the mixture (the dispersion) of the hydrocarbon solvent solution with the heated water into the gaseous phase in the steam stripping vessel during the time in which the mixture maintains the dispersion state, it is necessary that, after the mixing of the hydrocarbon solvent solution with the heated water, the resultant mixture as the dispersion be spouted into the gaseous phase in the steam stripping vessel within the dispersion maintenance time of the mixture as the dispersion. Specifically, it is preferred that the spouting of the dispersion into the gaseous phase in the steam stripping vessel in step (2) is conducted within 5 seconds, more advantageously within 2 seconds, after the hydrocarbon solvent solution of the hydrogenated block copolymer is mixed with the heated water. The expression "after the hydrocarbon solvent solution of the hydrogenated block copolymer is mixed with the heated water" means "after the agitation in the mixer (a) used for preparing the dispersion is stopped" or "after the dispersion is taken out from the mixer (a) used for preparing the dispersion". Further, in the case where the dispersion is further agitated by using a static tubular agitator as a mixer (b) (as described below), the expression "after the hydrocarbon solvent solution of the hydrogenated block copolymer is mixed with the heated water" means "after the dispersion is discharged from the static tubular agitator used as the mixer (b)".

As mentioned above, in the present invention, it is preferred that, after step (1) and prior to step (2), the dispersion which has been obtained by using the mixer (a) is further agitated by using a static tubular agitator as the mixer (b).

When a static tubular agitator is used as the mixer (b) in combination with the above-mentioned pressure control valve, it is preferred that, after the dispersion is agitated by using the static tubular agitator and before step (2), the dispersion is passed through the pressure control valve to thereby adjust the pressure $P_3$ (MPa) of the dispersion, as measured at the entrance of the pressure control valve, to a level which is equal to or higher than the vapor pressure $P_1$ (MPa) of the dispersion.

When the dispersion is introduced into the steam stripping vessel through the pressure control valve, the dispersion may be spouted directly from the pressure control valve. Alternatively, a nozzle may be provided at the exit of the pressure control valve so that the dispersion is spouted through the nozzle. The diameter of the nozzle and the number of the nozzle(s) vary depending on the viscosity, pressure and amount of the dispersion.

When the dispersion is spouted directly from the pressure control valve into the gaseous phase in the steam stripping vessel, the exit of the pressure control valve and the introduction port positioned at the upper portion of the steam stripping vessel may be either indirectly connected to each other through a pipe or directly connected to each other. The latter (direct connection) is preferred.

In the present invention, when the hydrocarbon solvent does not form an azeotropic mixture with water, it is preferred that the temperature of the heated water in the steam stripping vessel (the steam stripping temperature) is from the boiling point of the hydrocarbon solvent to 150° C. On the other hand, when the hydrocarbon solvent forms an azeotropic mixture with water, it is preferred that the steam stripping temperature is from the azeotropic point to 150° C.

When the hydrocarbon solvent does not form an azeotropic mixture with water, if the steam stripping temperature is lower than the boiling point of the hydrocarbon solvent, the efficiency of the removal of the hydrocarbon solvent is disadvantageously lowered, so that the produced crumbs tend to adhere to the steam stripping vessel or become agglomerated, thereby making it difficult to continuously, stably produce crumbs of the hydrogenated block copolymer for a long period of time. Also, when the hydrocarbon solvent forms an azeotropic mixture with water, if the steam stripping temperature is lower than the azeotropic point, the same problem as mentioned above tends to occur. On the other hand, when the steam stripping temperature is higher than 150° C., it is possible that the produced crumbs suffer discoloration.

The steam stripping temperature is selected, taking into consideration not only the above, but also the thermal stability of the hydrogenated block copolymer, the efficiency of the supply of steam for heating, and the like. From the viewpoint of the balance of all these factors, it is preferred that the steam stripping temperature is generally from 90 to 140° C., advantageously from 95 to 120° C.

Further, it is preferred to stir the heated water in the steam stripping vessel by means of an electric stirrer or the like during the steam stripping so as to prevent the occurrence of the problem that the hydrogenated block copolymer floats to form agglomerates on the surface of the heated water in the steam stripping vessel.

If desired, a surfactant as a crumb-forming agent may be added to the heated water in the steam stripping vessel for the purpose of preventing the agglomeration of the crumbs. As a crumb-forming agent, an anionic surfactant, a cationic surfactant or a nonionic surfactant is generally used. The crumb-forming agent is used generally in an amount of from 0.1 to 3,000 ppm by weight, based on the weight of the hydrogenated block copolymer in the steam stripping vessel. In the case where a crumb-forming agent is used, when the heated water in the steam stripping vessel is recycled for use as water for preparing the dispersion, care must be taken so that the dispersion is not emulsified by the action of the crumb-forming agent contained in the recycled heated water.

In addition to the above-mentioned surfactant, a salt of a metal, such as Li, Na, K, Mg, Ca, Al or Zn, can be used as a crumb-dispersing auxiliary.

By removing the hydrocarbon solvent by the method of the present invention, an aqueous slurry in which porous crumbs of the hydrogenated block copolymer are dispersed in the heated water can be continuously, stably produced for a long period of time (the above-mentioned porous crumbs, which contain water, are hereinafter, frequently referred to as "wet porous crumbs").

The concentration of the wet porous crumbs in the aqueous slurry is generally in the range of from 0.5 to 25% by weight, preferably from 1 to 20% by weight, more preferably from 3 to 15% by weight, based on the weight of the water in the steam stripping vessel. When the concentration of the wet porous crumbs in the aqueous slurry is in the above-mentioned range, crumbs having a suitable particle size as described below can be obtained.

By subjecting the aqueous slurry containing the wet porous crumbs to dehydration and drying, dried porous crumbs of the hydrogenated block copolymer can be continuously, stably produced for a long period of time. The dried porous crumbs have not only excellent handling properties but also a low water content and a high oil-absorbing capability, so that the dried porous crumbs can absorb a satisfactory amount of a liquid additive, such as a softening agent or a silicone oil. Therefore, when the dried porous crumbs are used as a modifier in the production of a molding resin composition from a thermoplastic resin and a liquid additive, such as a softening agent or a silicone oil, a shaped article having an excellent appearance can be produced by molding the molding resin composition.

As a preferred example of the method for the dehydration of the aqueous slurry containing the wet porous crumbs, there can be mentioned a step comprising subjecting the aqueous slurry to gravity dehydration, centrifugation dehydration or filtration dehydration to remove water from the slurry, thereby dehydrating the wet porous crumbs to an extent that the water content of the wet porous crumbs is in the range of from 20 to 90% by weight.

It is preferred that the wet porous crumbs to be subjected to dehydration have a particle size distribution wherein: (1) the amount of those crumbs which do not pass through a 2-mesh screen (hereinafter referred to as "large particle size wet crumbs") is 40% by weight or less, more advantageously 30% by weight or less, still more advantageously 15% by weight or less, based on the weight of the total mass of the wet porous crumbs; (2) the amount of those crumbs which pass through a 30-mesh screen and do not pass through a 42-mesh screen (hereinafter referred to as "small particle size wet crumbs") is 50% by weight or less, more advantageously 40% by weight or less, still more advantageously 30% by weight or less, based on the weight of the total mass of the wet porous crumbs; and (3) the amount of those crumbs which pass through a 42-mesh screen (hereinafter referred to as "extremely small particle size wet crumbs") is 0.1% by weight or less, more advantageously 0.05% by weight or less, most advantageously 0% by weight (that is, the wet porous crumbs contain no such crumb), based on the weight of the total mass of the wet porous crumbs.

The particle size distribution of the wet porous crumbs obtained in step (2) (the solvent removal step) of the method of the present invention can be controlled by appropriately selecting the conditions for performing the solvent removal by the method of the present invention, such as the agitation speed, the steam stripping temperature, the concentration of the crumbs in the heated water in the steam stripping vessel, the amount of a crumb-forming agent used or a crumb-dispersing auxiliary used, and the method for introducing the dispersion into the steam stripping vessel.

In the present invention, when the aqueous slurry obtained by the solvent removal contains large particle size wet crumbs in a very large amount, the large particle size wet crumbs can be crushed using a slurry pump or the like having the capability of crushing particles prior to the dehydration so that the amount of the large particle size wet crumbs is decreased to a level falling within the above-mentioned range.

In the dehydration step, by subjecting the aqueous slurry containing the wet porous crumbs (which have been obtained in the solvent removal step of the method of the present invention) to gravity dehydration, centrifugation dehydration, filtration dehydration or the like, the slurry can be dehydrated without suffering breakage of the pores of the crumbs. The above-mentioned methods for dehydration can be employed in combination. For example, the gravity dehydration can be employed in combination with the centrifugation dehydration or the filtration dehydration. In this connection, it should be noted that, when the dehydration of the wet porous crumbs is conducted by a method using a mechanical compression type dehydrator, such as a roll type or a Banbury type dehydrator or a screw extruder type compression dehydrator, a disadvantage tends to occur in that a shaped article produced from a molding resin composition containing the dried porous crumbs has a poor appearance, as compared to the case where the dehydration is conducted by gravity dehydration, centrifugation dehydration, filtration dehydration or the like.

By subjecting the dehydrated wet porous crumbs to a drying step, it becomes possible to continuously produce dried porous crumbs of the hydrogenated block copolymer stably and efficiently for a long period of time, wherein the dried porous crumbs produced have a high oil-absorbing capability and excellent handling properties, so that the crumbs are useful for providing a shaped article having an excellent appearance.

As a preferred example of the method for drying the dehydrated wet porous crumbs, there can be mentioned a method comprising exposing the dehydrated wet porous crumbs to heated air having a temperature of from 80 to 155° C. in a heated air-dryer having no thermal conduction type heating means, thereby drying the dehydrated wet porous crumbs.

Examples of heated air-dryers used in the drying method include a packed bed type heated air-dryer, a conveyance type heated air-dryer, an agitation type heated air-dryer, and a fluidized or moving bed type heated air-dryer. These dryers can be used in combination.

By subjecting the porous crumbs produced by the method of the present invention to the above-mentioned preferred mode of dehydration and the above-mentioned preferred mode of drying, dried porous crumbs having a water content of 1% by weight or less can be obtained. It is preferred that the water content of the dried porous crumbs is 0.8% by weight or less, more advantageously 0.5% by weight or less. When the water content of the dried porous crumbs exceeds 1% by weight, disadvantages are possibly caused wherein, in the molding of a molding resin composition containing the dried porous crumbs, the molding resin composition suffers disadvantageous phenomena, such as occurrence of foaming and silver streaks, so that a shaped article produced from the molding resin composition has poor appearance.

In the present invention, the oil-absorbing capability of the dried porous crumbs is defined as the ratio of the weight of an oil, which is absorbed by the dried porous crumbs when the dried porous crumbs are immersed in the oil at 25° C. under atmospheric pressure for 1 minute, to the weight of the dried porous crumbs, wherein the oil is a paraffin process oil (Diana Process Oil, Type PW-90, manufactured and sold by Idemitsu Petrochemical Co., Ltd., Japan; kinetic viscosity at 40° C.=95.54 mm$^2$/s). It is preferred that the dried porous crumbs obtained by subjecting the porous crumbs (produced by the method of the present invention) to the above-mentioned preferred mode of dehydration and the above-mentioned preferred mode of drying have an oil-absorbing capability of 1.0 or more. The oil-absorbing capability of the dried porous crumbs is more preferably 1.05 or more, most preferably 1.1 or more. When the dried porous crumbs have an oil-absorbing capability of less than 1.0, disadvantages are caused wherein, even when the dried porous crumbs are used in a molding resin composition containing various additives, especially a liquid additive, such as an oil serving as a softening agent or a plasticizer, it is difficult to satisfactorily disperse the additives in the molding resin composition, thereby making it difficult to efficiently produce a shaped article having an excellent appearance from the molding resin composition.

It is preferred that the dried porous crumbs obtained by subjecting the porous crumbs (produced by the method of the present invention) to the above-mentioned preferred mode of dehydration and the above-mentioned preferred mode of drying have a particle size distribution wherein the amount of those crumbs which pass through a 6-mesh screen and do not pass through a 42-mesh screen (hereinafter referred to as "suitable particle size crumbs") is 50% by weight or more, more advantageously 70% by weight or more, still more advantageously 80% by weight or more, based on the weight of the total mass of the dried porous crumbs, and wherein the particle sizes of all of the dried porous crumbs are within the range of from 50 to 150% of the average particle size of the dried porous crumbs.

It is preferred that the sizes of the pores of the dried porous crumbs are within the range of from 1.8 to 57 $\mu$m, and that the average pore size of the dried porous crumbs is within the range of from 3 to 20 $\mu$m. Further, the total volume of the pores having a size within the range of from 1.8 to 57 $\mu$m is preferably 300 mm$^3$/g or more, more preferably 330 mm$^3$/g or more, still more preferably 350 mm$^3$/g or more. The above-mentioned pore size, average pore size and pore volume can be measured by means of a mercury porosimeter.

As described above, the dried porous crumbs have a high oil-absorbing capability. Various additives may be added to the dried porous crumbs, depending on the intended use of the dried porous crumbs. Examples of such additives include softening agents (such as a paraffin oil and a naphthene oil, which are generally known as a mineral oil softening agent for rubbers), a silicone oil, a plasticizer, a lubricant, an anti-oxidizing agent, an ultraviolet light absorber, a light stabilizer, an anti-block agent, an antistatic agent, a flame retardant, a pigment, a dye, an inorganic filler, an inorganic fiber, an organic fiber and a carbon black. Each of these additives is used in an amount in which the additive is conventionally used.

Further, the dried porous crumbs can be blended with various thermoplastic resins. Examples of such thermoplastic resins include an olefin resin, such as a polyethylene, a poly-propylene, a polybutene, a block or random copolymer of ethylene and an α-olefin (such as propylene, 1-butene, 1-hexene or 1-octene), an ethylene/vinyl acetate copolymer or an ethylene/vinyl alcohol copolymer; an acrylonitrile/styrene copolymer resin; an acrylonitrile/butadiene/styrene copolymer resin; a polyphenylene ether resin; a polyester resin; a polyamide resin; a polycarbonate resin; a polymethacrylate resin; a vinyl chloride resin; and a vinylidene chloride resin. Each of these thermoplastic resins is used in an amount in which the resin is conventionally used.

BEST MODE FOR CARRYING OUT THE INVENTION

Hereinbelow, the present invention will be described in more detail with reference to the following Examples and Comparative Examples, which should not be construed as limiting the scope of the present invention.

The measurement and evaluation of various properties and characteristics in the following Examples and Comparative Examples are explained below.

(1) Molecular Weight of a Hydrogenated Block Copolymer

A hydrogenated block copolymer is dissolved in tetrahydrofuran to thereby obtain a solution. The obtained solution is analyzed at 43° C. by gel permeation chromatography (GPC) using an apparatus manufactured and sold by Waters Assoc. Co., U.S.A. The molecular weight at the peak of the obtained GPC chromatogram (i.e., a peak molecular weight) is determined by the use of a calibration curve obtained using the peak molecular weights of standard monodisperse polystyrene samples.

(2) Styrene Content of a Hydrogenated Block Copolymer

The styrene content of a hydrogenated block copolymer is calculated from the absorbance at a wavelength of 262 nm using an ultraviolet spectrometer (UV 200, manufactured and sold by Hitachi Ltd., Japan).

(3) Composition, Vinyl Bond Content and Degree of Hydrogenation of a Hydrogenated Block Copolymer The composition, vinyl bond content and degree of hydrogenation of a hydrogenated block copolymer are measured by the use of a nuclear magnetic resonance (NMR) apparatus (DPX-400, manufactured and sold by Bruker Analytik GmbH, Germany).

(4) Water Content of Dried Porous Crumbs of a Hydrogenated Block Copolymer

Dried porous crumbs of a hydrogenated block copolymer are allowed to stand at 140° C. for 45 minutes to thereby dry the crumbs. The water content of the crumbs is calculated, based on the difference in weight between the crumbs before the drying and the crumbs after the drying.

(5) Particle Size Distribution of Crumbs

Using a JIS screen, 100 g of wet porous crumbs are shaken for 20 minutes to thereby classify the crumbs. Then, the amounts of the following types of crumbs are determined: wet porous crumbs which do not pass through a 2-mesh screen (i.e., "large particle size wet crumbs"); wet porous crumbs which pass through a 30-mesh screen and do not pass through a 42-mesh screen (i.e., "small particle size wet crumbs"); and wet porous crumbs which pass through a 42-mesh screen (i.e., "extremely small particle size wet crumbs"). Also, with respect to dried porous crumbs, the amount of dried porous crumbs which pass through a 6-mesh screen and do not pass through a 42-mesh screen (i.e., "suitable particle size crumbs") is determined in substantially the same manner as mentioned above.

(6) Pore Diameter and Pore Volume of Dried Porous Crumbs

Using a mercury porosimeter (Pascal, Type 140, manufactured and sold by Thermo Quest, Italy), the pore diameter and pore volume of dried porous crumbs are measured by mercury porosimetry.

(7) Oil-absorbing Capability of Dried Porous Crumbs 10 g of dried porous crumbs are charged into a 200-mesh wire mesh pouch, and the pouch containing the crumbs is immersed at 25° C. under atmospheric pressure in 1 liter of a paraffin process oil (Diana Process Oil Type PW-90, manufactured and sold by Idemitsu Petrochemical Co., Ltd., Japan) (kinetic viscosity at 40° C.=95.54 mm$^2$/s) so that the all of the dried porous crumbs are immersed in the oil. After the dried porous crumbs are immersed in the oil for 1 minute, the dried porous crumbs are immediately taken out from the oil and introduced into a centrifugal separator, and the centrifugal separator is operated under 1,000 G for 3 minutes to thereby remove oil adhering to the crumbs from the crumbs. Then, the dried porous crumbs are taken out from the centrifugal separator, and the weight of the porous crumbs is measured. The oil-absorbing capability of the dried porous crumbs is calculated by the following formula.

Oil-absorbing capability={(the weight of the oil-containing porous crumbs after the centrifugation)−(the weight of the dried porous crumbs before the immersion in the oil)}/(the weight of the dried porous crumbs before the immersion in the oil)

(8) Appearance of a Shaped Article

100 Parts by weight of dried porous crumbs, 30 parts by weight of a commercially available polypropylene (J-Allomer MK755H, manufactured and sold by Japan Polyolefins Co., Ltd., Japan), and 105 parts by weight of a paraffin process oil (the above-mentioned Diana Process Oil Type PW-90) are mixed together to thereby prepare a molding composition. The prepared composition is melt kneaded at 190° C. and at 100 rpm using an extruder (20 mmφ) having two screws which rotate in opposite directions to thereby obtain a shaped article in the form of strands. The surface of the obtained shaped article is visually observed and the appearance of the shaped article is evaluated by the following criteria.

<Criteria for the Evaluation of the Appearance of a Shaped Article>

A: The surface of the shaped article is smooth as a whole and the shaped article has good appearance.

B: The surface of the shaped article is slightly rough.

C: The surface of the shaped article is very rough or foaming is observed in the surface of the shaped article and, hence, the appearance of the shaped article is poor.

EXAMPLE 1

(Preparation of a Block Copolymer)

An autoclave provided with a stirrer and a jacket was fully purged with nitrogen gas. Into the autoclave were charged 1,835 kg of cyclohexane and 90 g of n-butyllithium as a polymerization catalyst. Then, the polymerization reactions for producing a block copolymer were performed as follows. First, 40 kg of a styrene monomer was charged into the autoclave to thereby perform a polymerization reaction. Next, 170 kg of a 1,3-butadiene monomer was charged into the autoclave to thereby perform a further polymerization reaction. Finally, 40 kg of a styrene monomer was charged into the autoclave to thereby perform still a further polymerization reaction, thereby obtaining a solution of a block copolymer having an S-B-S configuration (S represents a polystyrene block, and B represents a polybutadiene block).

During the above-mentioned polymerization reactions, the reaction pressure was controlled within the range of from 0.29 to 0.49 MPa, the reaction temperature was controlled within the range of from 40 to 80° C., and N,N,N'N'-tetramethylethylenediamine (hereinafter referred to as "TMEDA") was used as an agent for adjusting the vinyl bond content of the polybutadiene blocks of the block copolymer. The obtained block copolymer had a styrene content of 32% by weight, and the butadiene moiety of the block copolymer had a vinyl bond content of 37 mol %.

(Preparation of a Hydrogenated Block Copolymer)

The autoclave containing the obtained solution of the block copolymer was deaerated under reduced pressure and purged with hydrogen gas. Then, the autoclave was maintained at 90° C. while stirring. A hydrogenation catalyst solution {which had been prepared by mixing a cyclohexane solution of di-p-tolylbis(η-cyclopentadienyl)titanium with a cyclohexane solution of n-butyllithium at 0° C. under a hydrogen pressure of 0.29 MPa} (Li/Ti molar ratio in the catalyst solution=4) was added to the solution of the block copolymer in the autoclave to thereby perform a hydrogenation for 2 hours while stirring and introducing dried hydrogen gas (hydrogen pressure: 0.59 MPa) into the autoclave, thereby obtaining a hydrogenated block copolymer in the form of a solution thereof in cyclohexane. The degree of hydrogenation in the polybutadiene block of the obtained hydrogenated block copolymer was 99 mol % (almost all of the benzene rings in the polystyrene blocks were not hydrogenated). The molecular weight of the hydrogenated block copolymer was 300,000 and the concentration of the hydrogenated block copolymer in the solution was about 12% by weight.

In the thus obtained solution of the hydrogenated block copolymer, the amount of cyclohexane was 734 parts by weight, relative to 100 parts by weight of the hydrogenated block copolymer.

To the obtained solution of the hydrogenated block copolymer was added water in a molar amount 20 times the molar amount of the n-butyllithium used (the sum of the n-butyllithium used as the polymerization catalyst and the n-butyllithium used in the hydrogenation catalyst). Into the resultant solution containing the hydrogenated block copolymer was introduced carbon dioxide gas to thereby adjust the pH of the mixture to about 7.5. Then, to the resultant solution containing the hydrogenated block copolymer was added pentaerythrityl-tetrakis(3-(3,5-di-tert-butyl-4-hydroxyphenyl)propionate) as a stabilizer (0.1 part by weight, relative to 100 parts by weight of the hydrogenated block. copolymer).

The resultant solution was stored in a tank while maintaining the temperature of the solution at 90° C.

(Solvent Removal)

Using a system as shown in FIG. 1, wet porous crumbs of the hydrogenated block copolymer were produced from the solution of the hydrogenated block copolymer stored in the tank, as follows.

The above-obtained solution of the hydrogenated block copolymer was introduced into mixer 5 by spouting the solution from a nozzle through pipe 1. Deionized water as heated water was introduced into mixer 5 through pipe 2, injector 3 and pipe 4. The solution of the hydrogenated block copolymer was mixed with the heated water (deionized water) in mixer 5 to obtain a dispersion of the solution of the hydrogenated block copolymer in the heated water.

The amount of the heated water introduced into mixer 5 was controlled so that the weight ratio of the heated water to the solution of the hydrogenated block copolymer was 4. Using steam which was fed through pipe 6 and injected by injector 3, the heated water introduced into mixer 5 was heated so that the temperature of the heated water was elevated to 140° C., thereby adjusting the temperature of the dispersion obtained in mixer 5 to 130° C.

The dispersion was led through pipe 7 and introduced into static tubular agitator 8 (STATIC MIXER, manufactured and sold by NORITAKE CO., LTD., Japan), by means of which the dispersion was further agitated. Then, the dispersion was led through pipe 9 and introduced into pressure control valve 10.

Since a preliminary experiment had shown that the dispersion exhibited a dispersion maintenance time of 8 seconds under the above-mentioned conditions, the length of pipe 9 was selected so that the residence time of the dispersion in pipe 9 (the time which is necessary for the dispersion to move from the exit of STATIC MIXER 8 to pressure control valve 10) was 0.5 second.

Since a thermodynamic calculation based on the composition and temperature of the dispersion showed that the vapor pressure $P_1$ (MPa) of the dispersion was 0.49 MPa, the predetermined level of pressure of pressure control valve 10 was set at 0.59 MPa to thereby adjust the pressure $P_3$ (MPa) of the dispersion to 0.59 MPa. Specifically, the adjustment of the pressure $P_3$ of the dispersion was made as follows. A nozzle was provided in a side of pipe 9, wherein the nozzle was positioned near the entrance of pressure control valve 10. At the outer end of the nozzle was provided a diaphragm type pressure transmission device. The pressure of the dispersion was measured by means of the pressure transmission device, and the measured value of pressure was transmitted to a field type pressure adjusting device (manufactured and sold by Yamatake Industrial Systems Co., Ltd., Japan). The pressure adjusting device compared the measured value of pressure transmitted thereto with the predetermined level of pressure preset in the pressure adjusting device. If there was a difference between the measured value of pressure and the predetermined level of pressure, the pressure adjusting device transmitted to pressure control valve 10 a signal for performing an adjusting operation in accordance with the pressure difference (thus performing feedback control, i.e., control by sending an output signal in response to an input signal). The regulatory operation for determining what output signal should be sent in response to an input signal was performed by PID action (proportional-integral-derivative action). In FIG. 1, the above-mentioned pressure adjusting operation by feedback control is indicated by a broken line which connects pipe 9 to pressure control valve 10.

The exit of pressure control valve 10 is directly connected to the flange of steam stripping vessel 11 having a volume of 350 liters and is directed toward the surface of the heated water in steam stripping vessel 11. The dispersion was spouted from pressure control valve 10 into the gaseous phase in steam stripping vessel 11, wherein the direction of the spouting was such that the dispersion directly reached the surface of the heated water in steam stripping vessel 11 without hitting against the inner wall of steam stripping vessel 11.

It was confirmed that the dispersion immediately before being spouted from pressure control valve 10 was actually in a dispersion state in which the solution of the hydrogenated block copolymer was dispersed in the heated water. The confirmation was made by a method in which a sampling nozzle (not shown) is provided at a portion of the underside wall of pipe 9 which portion is adjacent to pressure control valve 10, and a sample of the dispersion is taken out from pipe 9 through the sampling nozzle and analyzed.

The pressure $P_2$ of the gaseous phase in steam stripping vessel 11 was adjusted to 10 MPa.

Steam was fed into steam stripping vessel 11 through pipe 12 so that the temperature of the heated water in steam stripping vessel 11 was adjusted to a temperature of 100° C., at which the steam stripping was conducted. During the steam stripping, the heated water in steam stripping vessel 11 was stirred by means of electric stirrer 13.

The cyclohexane separated from the hydrogenated block copolymer, together with steam, was led through pipe 14 and condenser 15 and introduced into solvent separation vessel 16. In solvent separation vessel 16, the cyclohexane was separated from water 18 and recovered as solvent 17.

On the other hand, wet porous crumbs of the hydrogenated block copolymer, obtained in the heated water in steam stripping vessel 11, were withdrawn from the bottom of steam stripping vessel 11 in the form of an aqueous slurry containing the wet porous crumbs. The aqueous slurry was transferred to dehydrator 20 by means of pump 19. In dehydrator 20, the wet porous crumbs in the aqueous slurry were separated from water and recovered as wet porous crumbs 21. The water separated in dehydrator 20 was pressurized by means of pump 22 and led through pipe 23, and, then, a part of the water was led through pipe 24 and recycled to steam stripping vessel 11 as recycled water for re-use in steam stripping, and the remainder was discharged through pipe 25. Opening/closing valve 26 was kept closed, and the water which was led through pipe 23 was not used as heated water for mixing with the solution of the hydrogenated block copolymer.

In the above-mentioned steam stripping, as a crumb-forming agent, a mixture of phosphoric monoester of and diester of ω-hydroxy poly(oxy-ethylene)-α-dodecylether was added to the heated water in steam stripping vessel 11 in an amount of 600 ppm by weight, based on the weight of the hydrogenated block copolymer.

The amount of the wet porous crumbs contained in the aqueous slurry was 3% by weight, based on the weight of water contained in the aqueous slurry. With respect to the particle size distribution of the wet porous crumbs, the amounts of the "large particle size wet crumbs" and the "small particle size wet crumbs" were, respectively, 0% by weight and 13% by weight, based on the weight of the total mass of the wet porous crumbs. The wet porous crumbs contained no "extremely small particle size wet crumbs".

(Dehydration and Drying)

Using a slurry pump having the capability of crushing particles, the above-mentioned aqueous slurry containing the wet porous crumbs of the hydrogenated block copolymer was fed to a continuous pusher type centrifugation dehydrator (Escherwyss, manufactured and sold by Tsukishima Kikai Co., Ltd., Japan) to thereby effect a centrifugation dehydration under conditions wherein the acceleration of gravity was 900 G and the slit width of the screen for separating water was 0.3 mm, thereby obtaining dehydrated wet porous crumbs of the hydrogenated block copolymer. The obtained dehydrated wet porous crumbs had a water content of 44% by weight.

Using a horizontal continuous fluidized bed dryer (Type FBA-2, manufactured and sold by Okawara MFG. Co., Ltd., Japan) having no thermal conduction type heating means, the dehydrated wet porous crumbs were dried under conditions wherein the temperature of heated air fed to the dryer was 150° C. and the residence time of the crumbs in the dryer was 15 minutes, thereby obtaining dried porous crumbs of the hydrogenated block copolymer.

The operation for producing the dried porous crumbs was continuously conducted for 5 days. The operation was able to be conducted in a stable manner without suffering any trouble, such as clogging at pressure control valve 10 and the like. The amount of the dried porous crumbs produced was 250 kg.

All of the obtained dried porous crumbs were the "suitable particle size crumbs". The dried porous crumbs had an average pore diameter of 12.1 μm and a pore volume of 390 mm$^3$/g.

The dried porous crumbs had a water content of 0.3% by weight and an oil-absorbing capability of 1.4. With respect to the shaped article produced from the dried porous crumbs, the result of the evaluation of the appearance, which was conducted in accordance with the above-mentioned method, was "A".

Various conditions and results are shown in Table 1.

EXAMPLE 2

Dried porous crumbs were produced in substantially the same manner as in Example 1, except that a line mixer (T.K. PIPELINE HOMO-MIXER, manufactured and sold by Tokushu Kika Kogyo Co., Ltd., Japan) was used as mixer 5.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.3% by weight and an oil-absorbing capability of 1.4. With respect to the shaped article produced from the dried porous crumbs, the result of the evaluation of the appearance, which was conducted in accordance with the above-mentioned method, was "A".

Various conditions and results are shown in Table 1.

EXAMPLE 3

Dried porous crumbs were produced in substantially the same manner as in Example 1, except:
   that, in the solution of the hydrogenated block copolymer, the amount of cyclohexane was 1,567 parts by weight, relative to 100 parts by weight of the hydro-genated block copolymer, and
   that, in the solvent removal, the weight ratio of the heated water introduced into mixer 5 to the solution of the hydrogenated block copolymer introduced into mixer 5 was 10.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.5% by weight and an oil-absorbing capability of 1.2. With respect to the shaped article produced from the dried porous crumbs, the result of the evaluation of the appearance, which was conducted in accordance with the above-mentioned method, was "A".

Various conditions and results are shown in Table 1.

EXAMPLE 4

Dried porous crumbs were produced in substantially the same manner as in Example 1, except that, in the solvent removal, the weight ratio of the heated water introduced into mixer 5 to the solution of the hydrogenated block copolymer introduced into mixer 5 was 2.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.6% by weight and an oil-absorbing capability of 1. With respect to the shaped article produced from the dried porous crumbs, the result of the evaluation of the appearance, which was conducted in accordance with the above-mentioned method, was "A".

Various conditions and results are shown in Table 1.

EXAMPLE 5

Dried porous crumbs were produced in substantially the same manner as in Example 1, except that, in the solvent removal, the temperature of the dispersion was 105° C.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.4% by weight and an oil-absorbing capability of 1.2. With respect to the shaped article produced from the dried porous crumbs, the result of the evaluation of the appearance, which was conducted in accordance with the above-mentioned method, was "A".

Various conditions and results are shown in Table 1.

EXAMPLE 6

Dried porous crumbs were produced in substantially the same manner as in Example 1, except that, instead of deionized water, the water (recycled water) separated in dehydrator 20 (i.e., the water which was led through pipe 23) was used as heated water to be mixed with the solution of the hydrogenated block copolymer, wherein opening/closing valve 26 was kept open.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.3% by weight and an oil-absorbing capability of 1.4. With respect to the shaped article produced from the dried porous crumbs, the result of the evaluation of the appearance, which was conducted in accordance with the above-mentioned method, was "A".

Various conditions and results are shown in Table

EXAMPLE 7

Dried porous crumbs were produced in substantially the same manner as in Example 1, except:

that, instead of the use of deionized water, the water separated in dehydrator 20 (i.e., the water which was led through pipe 23) was recycled for use as heated water to be mixed with the solution of the hydrogenated block copolymer, wherein opening/closing valve 26 was kept open, that the same line mixer as used in Example 2 was used as mixer 5, and that STATIC MIXER 8 shown in FIG. 1 was not used, and mixer 5 and pressure control valve 10 were connected with each other through a pipe.

The length of the pipe between mixer 5 and pressure control valve 10 was selected so that the residence time of the dispersion in the pipe was 5 seconds.

It was confirmed that the dispersion immediately before being spouted from pressure control valve 10 was fairly in a dispersion state in which the solution of the hydrogenated block copolymer was dispersed in the heated water. The confirmation was made by a method in which a sampling nozzle is provided at a portion of the underside wall of the above-mentioned pipe which portion is adjacent to pressure control valve 10, and a sample of the dispersion is taken out from the pipe through the sampling nozzle and analyzed.

The operation for producing the dried porous crumbs was continuously conducted for 5 days. The operation was able to be stably conducted. The dried porous crumbs produced had a water content of 0.8% by weight and an oil-absorbing capability of 1. With respect to the shaped article produced from the dried porous crumbs, the result of the evaluation of the appearance, which was conducted in accordance with the above-mentioned method, was "B".

Various conditions and results are shown in Table 1.

EXAMPLE 8

As a hydrogenated block copolymer, 250 kg of KRATON G1651 (manufactured and sold by SHELL, the Netherlands) was used (KRATON G1651 is a powdery straight chain SEBS having a styrene content of 33% by weight, wherein the term "SEBS" means a hydrogenation product of a styrene/butadiene/styrene block copolymer). The hydrogenated block copolymer was divided into 10 portions and portionwise dissolved in cyclohexane to obtain a cyclohexane solution of the hydrogenated block copolymer, wherein the cyclohexane solution of the hydrogenated block copolymer had a temperature of 90° C. and had a cyclohexane content of 734 parts by weight, relative to 100 parts by weight of the hydrogenated block copolymer.

Using the above-mentioned solution, the solvent removal, dehydration and drying were performed in substantially the same manner as in Example 1, thereby producing dried porous crumbs.

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.3% by weight and an oil-absorbing capability of 1.3. With respect to the shaped article produced from the dried porous crumbs, the result of the evaluation of the appearance, which was conducted in accordance with the above-mentioned method, was "A".

Various conditions and results are shown in Table 1.

EXAMPLE 9

Dried porous crumbs were produced in substantially the same manner as in Example 8, except that, instead of KRATON G1651 as a hydrogenated block copolymer, Septon 4055 (manufactured and sold by Kuraray Co., Ltd., Japan) was used (Septon 4055 is a powdery SEPS having a styrene content of 33% by weight, wherein the term "SEPS" means a hydrogenation product of a styrene/isoprene/styrene block copolymer).

It was confirmed that the dispersion immediately before being spouted from pressure control valve 10 was fairly in a dispersion state in which the solution of the hydrogenated block copolymer was dispersed in the heated water. The confirmation was made in substantially the same manner as in Example 1.

The operation for producing the dried porous crumbs was continuously conducted for 5 days. The operation was able to be stably conducted. The dried porous crumbs produced had a water content of 0.3% by weight and an oil-absorbing capability of 1.3. With respect to the shaped article produced from the dried porous crumbs, the result of the evaluation of the appearance, which was conducted in accordance with the above-mentioned method, was "A".

Various conditions and results are shown in Table 1.

Reference Example 1

Dried porous crumbs were produced in substantially the same manner as in Example 1, except:

that the temperature of the dispersion in the solvent removal step was adjusted to 90° C., thereby adjusting the vapor pressure $P_1$ (MPa) of the dispersion to 0.18 MPa, and that the pressure of pressure control valve 10 was preset at 0.15 MPa, thereby adjusting the pressure $P_3$ (MPa) of the dispersion to 0.15 MPa.

The operation for producing the dried porous crumbs was continuously conducted for 5 days. However, during the operation, the pressure control by means of pressure control valve 10 became unstable, so that some difficulties were encountered in conducting the continuous operation for producing dried porous crumbs. The dried porous crumbs produced had a water content of 0.4% by weight and an oil-absorbing capability of 0.7. With respect to the shaped article produced from the dried porous crumbs, the result of the evaluation of the appearance, which was conducted in accordance with the above-mentioned method, was "C".

Various conditions and results are shown in Table 1.

Comparative Example 1

Dried porous crumbs were produced in substantially the same manner as in Example 7, except:

that an emulsifier was added to the solution of the hydrogenated block copolymer before the solution was introduced into mixer 5, and that a crumb-forming agent was not added to the heated water in steam stripping vessel 11.

As the above-mentioned emulsifier, an anionic surfactant (trade name: PLYSURF; manufactured and sold by Daiichi Kogyo Seiyaku Co., Ltd., Japan) and a nonionic surfactant (trade name: TWEEN 60; manufactured and sold by Kao Atlas Co., Ltd., Japan) were used in a total amount of 600 ppm by weight, based on the weight of the hydrogenated block copolymer.

It was confirmed that the dispersion immediately before being spouted from pressure control valve 10 was in a stably emulsified state. The confirmation was made in substantially the same manner as in Example 1.

The operation for producing the dried porous crumbs was continuously conducted for 5 days. Wet porous crumbs obtained in the course of the operation contained the "extremely small particle size wet crumbs" in an amount as large as 5% by weight. Therefore, the dehydration of the wet porous crumbs was not able to be conducted to a satisfactory extent, and the dried porous crumbs produced had a water content as large as 1.5% by weight. Further, the "extremely small particle size wet crumbs" escaped into the recycled water (i.e., the water separated in dehydrator 20), so that it was difficult to conduct the continuous operation for producing dried porous crumbs.

Since not only did the dried porous crumbs have a high water content but also it was difficult to conduct the continuous operation, production and evaluation of a shaped article were not conducted.

Various conditions and results are shown in Table 1.

TABLE 1

| | Example 1 | Example 2 | Example 3 | Example 4 | Example 5 | Example 6 | Example 7 | Example 8 | Example 9 | Reference Example 1 | Comparative Example 1 |
|---|---|---|---|---|---|---|---|---|---|---|---|
| Residence time of the dispersion (sec.) | 0.5 | 0.5 | 0.5 | 0.5 | 0.5 | 0.5 | 5 | 0.5 | 0.5 | 0.5 | 5 |
| Weight ratio of the heated water to the solution of the hydrogenated block copolmer | 4 | 4 | 10 | 2 | 4 | 4 | 4 | 4 | 4 | 4 | 4 |
| Temperature of the dispersion (° C.) | 130 | 130 | 130 | 130 | 105 | 130 | 130 | 130 | 130 | 90 | 130 |
| Vapor pressure of the dispersion (Mpa) | 0.49 | 0.49 | 0.49 | 0.49 | 0.28 | 0.49 | 0.49 | 0.49 | 0.49 | 0.18 | 0.49 |

TABLE 1-continued

|  | Example 1 | Example 2 | Example 3 | Example 4 | Example 5 | Example 6 | Example 7 | Example 8 | Example 9 | Reference Example 1 | Comparative Example 1 |
|---|---|---|---|---|---|---|---|---|---|---|---|
| Pressure of the dispersion (MPa) | 0.59 | 0.59 | 0.59 | 0.59 | 0.59 | 0.59 | 0.59 | 0.59 | 0.59 | 0.15 | 0.59 |
| Pressure of the gaseous phase in the steam stripping vessel (MPa) | 0.10 | 0.10 | 0.10 | 0.10 | 0.10 | 0.10 | 0.10 | 0.10 | 0.10 | 0.10 | 0.10 |
| Continuous operation properties | good | good | good | good | good | good | good | good | good | slightly difficult | difficult |
| Oil-absorbing capability of the dried porous crumbs | 1.4 | 1.4 | 1.2 | 1 | 1.2 | 1.4 | 1 | 1.3 | 1.3 | 0.7 | 1 |
| Appearance of a shaped article | A | A | A | A | A | A | B | A | A | C | — |
| Water content of the dried porous crumbs (% by weight) | 0.3 | 0.3 | 0.5 | 0.6 | 0.4 | 0.3 | 0.8 | 0.3 | 0.3 | 0.4 | 1.5 |
| Content of extremely small particle size wet crumbs (% by weight) | 0 | 0 | 0 | 0 | 0 | 0 | 0 | 0 | 0 | 0 | 5 |

INDUSTRIAL APPLICABILITY

By the method of the present invention, desired porous crumbs can be stably and efficiently produced for a long period of time. Further, by subjecting the porous crumbs produced by the method of the present invention to dehydration step and drying step, dried porous crumbs can be continuously produced stably for a long period of time. The dried porous crumbs thus produced have not only excellent handling properties but also a low water content and a high oil-absorbing capability, so that the dried porous crumbs can absorb a satisfactory amount of a liquid additive, such as a softening agent or a silicone oil. Therefore, when the dried porous crumbs are used as a modifier in the production of a molding resin composition from a thermoplastic resin and a liquid additive, such as a softening agent or a silicone oil, a shaped article having excellent appearance can be produced by molding the molding resin composition.

What is claimed is:

1. A method for removing a hydrocarbon solvent from a hydrocarbon solvent solution of a hydrogenated block copolymer, said hydrogenated block copolymer being obtained by hydrogenating a block copolymer comprising at least one polymer block composed mainly of vinyl aromatic monomer units and at least one polymer block composed mainly of conjugated diene monomer units, wherein the weight ratio of said vinyl aromatic monomer units to said conjugated diene monomer units is in the range of from 5/95 to 95/5, said hydrogenated block copolymer having a degree of hydrogenation of 30% or more with respect to the double bonds in said conjugated diene monomer units, said method comprising the steps of:

(1) mixing a hydrocarbon solvent solution of said hydrogenated block copolymer with heated water to obtain a dispersion of said hydrocarbon solvent solution in said heated water, wherein said dispersion is not emulsified, and (2) introducing said dispersion into a steam stripping vessel containing heated water, wherein said dispersion is spouted into the gaseous phase in said steam stripping vessel toward the surface of the heated water in said steam stripping vessel under conditions wherein the vapor pressure $P_1$ (MPa) of said dispersion and the pressure $P_2$ (MPa) of said gaseous phase in said steam stripping vessel satisfy the following formula:

$$P_1 \geq P_2$$

thereby effecting a steam stripping of said dispersion to remove said hydrocarbon solvent from said dispersion and obtain porous crumbs of said hydrogenated block copolymer.

2. The method according to claim 1, wherein said dispersion is passed through a pressure control valve after step (1) and prior to step (2), to thereby adjust the pressure $P_3$ (MPa) of said dispersion, as measured at the entrance of said pressure control valve, to a level which is equal to or higher than the vapor pressure $P_1$ (MPa) of said dispersion.

3. The method according to claim 1, wherein said dispersion has a weight ratio of said heated water to said hydrocarbon solvent solution of said hydrocarbon solvent solution of said hydrogenated block copolymer in the range of from 1.0 to 100.

4. The method according to claim 1, wherein, in step (2), the vapor pressure $P_1$ of said dispersion is 0.05 MPa or more higher than the pressure $P_2$ of said gaseous phase in said steam stripping vessel.

5. The method according to claim 1, wherein the spouting of said dispersion into the gaseous phase in said steam stripping vessel in step (2) is conducted within 5 seconds after the mixing of said hydrocarbon solvent solution of said hydrogenated block copolymer with said heated water.

6. The method according to claim 1, wherein said dispersion is agitated by using a static tubular agitator after step (1) and prior to step (2), to thereby maintain the dispersion state of said dispersion.

7. The method according to claim 6, wherein, after said dispersion is agitated by using said static tubular agitator and before step (2), said dispersion is passed through a pressure control valve to thereby adjust the pressure $P_3$ (MPa) of said dispersion, as measured at the entrance of said pressure control valve, to a level which is equal to or higher than the vapor pressure $P_1$ (MPa) of said dispersion.

8. The method according to claim 1, wherein the molecular weight of said hydrogenated block copolymer is 70,000 or more, said molecular weight being defined as a peak molecular weight as measured by gel permeation chromatography using a calibration curve obtained using a chromatogram of standard polystyrene samples.

* * * * *